United States Patent [19]

Rendzio

[11] Patent Number: 4,687,219

[45] Date of Patent: Aug. 18, 1987

[54] PIVOTABLE TRAILER EXTENSION

[76] Inventor: Joseph J. Rendzio, P.O. Box 15776, Tampa, Fla. 33684

[21] Appl. No.: 843,041

[22] Filed: Mar. 24, 1986

[51] Int. Cl.⁴ .............................................. B62D 3/10
[52] U.S. Cl. ................................... 280/414.1; 414/536
[58] Field of Search ...................... 280/414.1; 414/534, 414/536

[56] References Cited

U.S. PATENT DOCUMENTS 4,463,965  8/1984  Lawson ............................ 280/414.1

Primary Examiner—John J. Love
Assistant Examiner—Donn McGiehan
Attorney, Agent, or Firm—Dominik, Stein, Saccocio & Reese

[57] ABSTRACT

A pivotal trailer extension including a pivotable platform mounted to an upwardly extending support member for trailers. The platform has mounted thereon a winch and a "V"-shaped chock block. The platform is dynamically pivoted when the bow of the boat is winched onto the trailer and into the "V" block during the loading of the boat from the water at a sloped boat dock and remains fully chock-up as the floating boat settles on the bunks when the trailer is pulled from the water.

5 Claims, 4 Drawing Figures

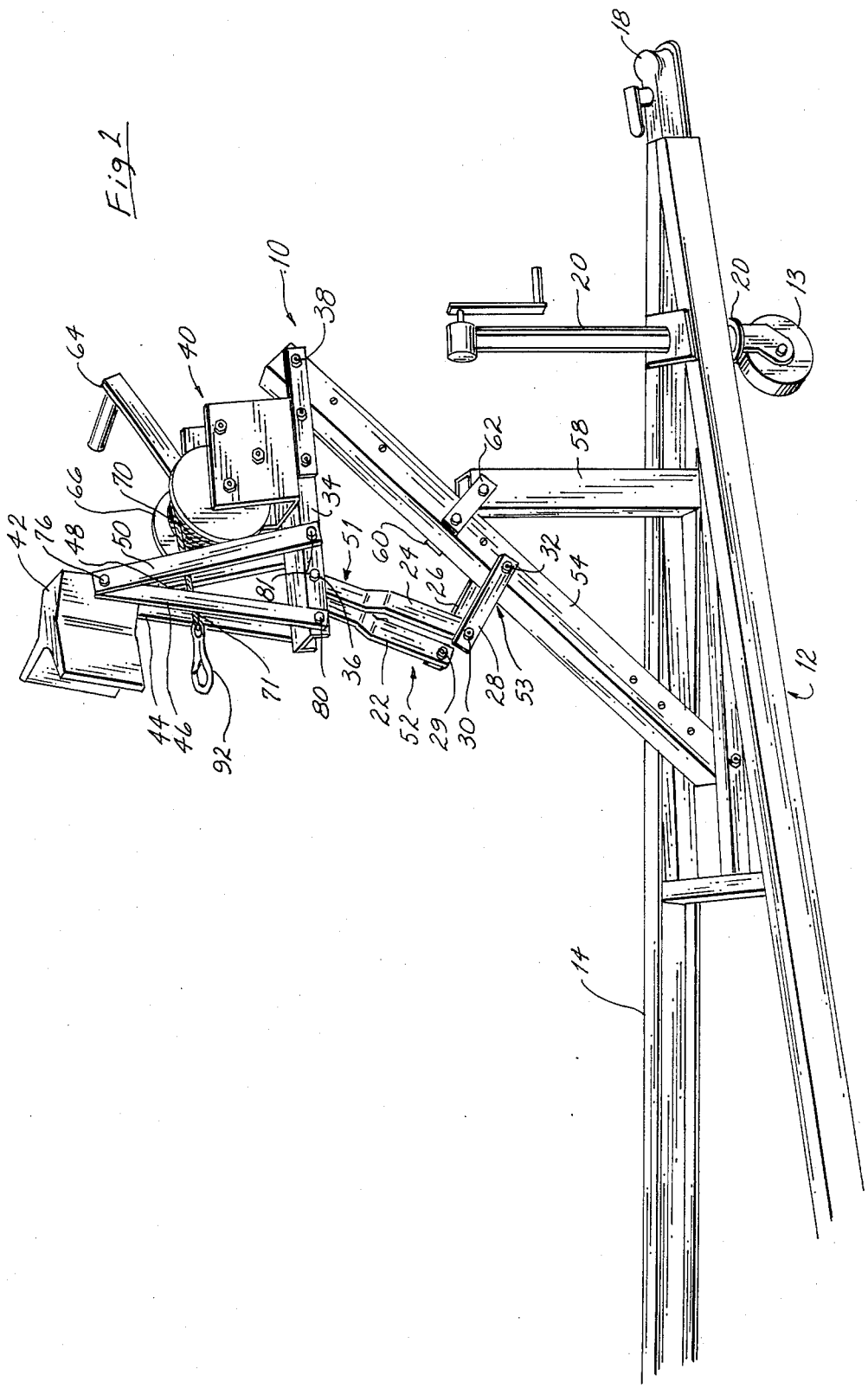

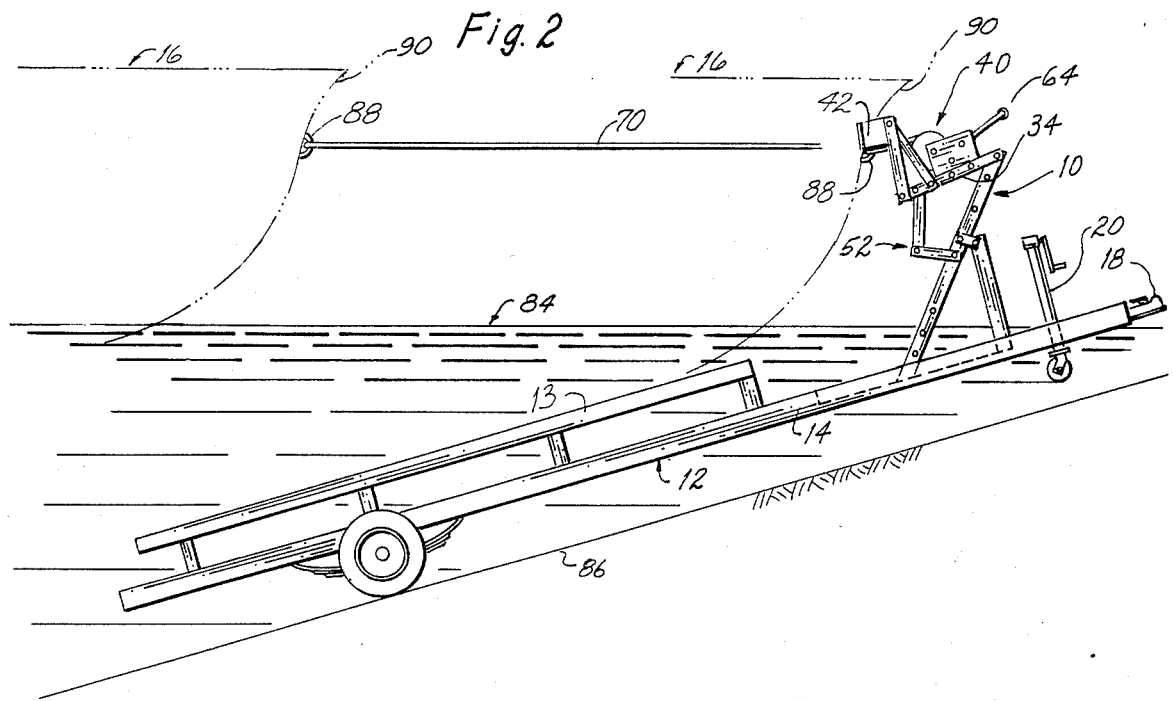
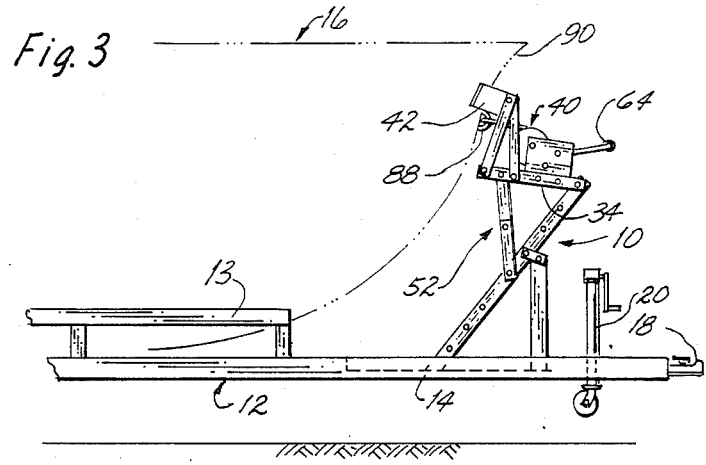
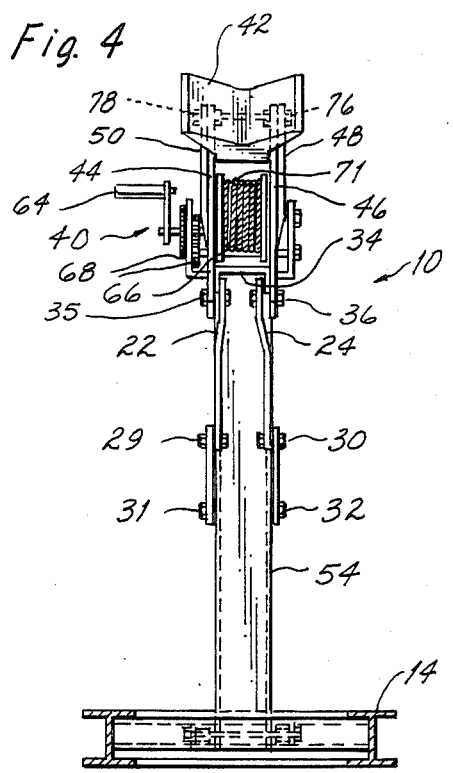

PIVOTABLE TRAILER EXTENSION

BACKGROUND OF THE INVENTION

1. Field of the Invention

This invention relates to boat trailer winching devices. More particularly, this invention relates to an apparatus which assures that a boat remains fully chocked-up as the boat and trailer are pulled from a boat ramp onto a flat surface.

2. Description of the Background Art

Presently there exist many types of winching devices and boat trailers designed to remove a boat from a body of water and to transport same over land. These types of winch devices and trailers utilize various semi-adjustable members and boat support means to accomplish their intended purpose.

For example, U.S. Pat. No. 4,463,965 issued to Lawson illustrates an add-on retainer device for use in combination with a boat trailer. The device comprises a platform member having a slot formed therein which receives and engages the bow eyelet of a boat. More specifically, the bow eyelet of the boat is engaged via a cammed edged securement hook.

U.S. Pat. No. 4,464,092 issued to Chambers, et al teaches a boat trailer comprising a winch whose height and position can be adjusted thereby affecting the loading and unloading of a boat. More specifically, once the height and position adjustments have been permanently made via a set of U-bolts, a pair of rollers pivot dynamically to render lateral and vertical support to the hull of the boat's bow. The configuration taught in Chambers, et al serves to prevent slippage of the boat during tow.

French Pat. No. 1,425,470 discloses a fixed winch mechanism whose cable is guided to the retaining ring of the boat by means of an upwardly adjustable pivot member. Additionally, the V-block disclosed in the French patent is connected to a member which, in turn, is pivotally connected to the upright support member. These members once adjusted aid in loading and unloading of a boat and operate in conjunction with a centrally fixed keel roller.

U.S. Pat. No. 3,403,798 issued to Flachbarth, et al teaches a boat trailer having a winch mechanism connected to an upright support member which is in turn bolted to a horizontal support member. More specifically, the upright support member can be adjusted longitudinally while the winch mechanism can be adjusted vertically to aid in the loading and unloading of a boat.

U.S. Pat. No. 4,262,922, issued to Nelson, teaches a stabilizing device for a boat trailer having a floater bar. More specifically, a hydraulic shock absorber is secured between the bow eyelet of the boat and the trailer with the shock absorber having a clevis arrangement at at least one end. This arrangement provides a shock absorbing assembly for dampening the tendency of a boat to bounce while being transported on a trailer. U.S. Pat. No. 4,193,610, issued to Miller, III, illustrates yet another shock absorbing device for boat trailers. A floater bar is disclosed which passes through a restricted opening in a mounting head which engages the hull of the boat and is joined to a pair of automotive type shock absorbers secured at one end to the frame of the boat trailer.

British Pat. No. 1,439,849, issued to Slack, teaches an apparatus for use with boats having relatively deep drafts in excess of ten inches. More specifically, Slack teaches a V-block connected to pivotal members which allow the V-block to be adjusted upwardly and downwardly to fit the particular bow structure of the boat being transported. This structure serves only to limit the forward movement of the boat during transport.

A major disadvantage with boat trailers including a winch mechanism and a chock assembly is the inability to pull the boat in a fully chocked up position to the chock assembly and keep the boat fully chocked up as the boat and trailer are pulled from a boat ramp onto a level surface. Indeed, experience has shown, particularly in regard to larger boats, that the boat pivots on the trailer at a point aft of the bow as the boat and trailer are pulled from the water thereby forcing the bow upwardly and separating itself from the chock assembly. This then requires the boat owner to force the boat forward to its fully chocked position. Since cranking of the winch assembly may be difficult or impossible due to the weight of the boat, it is fairly common to force the boat forward by pulling the trailer forward with a vehicle and then sharply applying the brakes such that the boat slides forward to the fully chocked position. Obviously, excessive force may be imparted to the trailer as the boat comes to an abrupt halt upon sliding forward.

Therefore, it is an object of this invention is to provide an apparatus which overcomes the aforementioned inadequacies of the prior art devices and provides an improvement which is a significant contribution to the advancement of the boat trailer art.

Another object of this invention is to provide a pivotal trailer extension for assuring that a boat will be fully chocked-up during loading operations and as the boat and trailer are pulled from the boat ramp.

Another object of the invention is to provide a pivotable trailer extension which enhances the ease of loading and unloading of a boat on and off a trailer.

Still another object of this invention is to provide a pivotable trailer extension which is economical to manufacture utilizing structural members which are of reduced weight while maintaining the requisite strength for the desired function.

Another object of the invention is to allow a person to launch or load a boat without undue physical exertion or stress.

Still another object of this invention is to provide a device of optimum design utilizing a minimum number of parts and shapes which are so correlated and cooperating with each other to substantially reduce the overall weight and physical size of the device yet still providing the requisite rigidity for maximum functional performance under the most severe of operating conditions imposed through loading of the boat onto a trailer.

The foregoing has outlined some of the more pertinent objects of the invention. These objects should be construed to be merely illustrative of some of the more prominent features and applications of the intended invention. Many other beneficial results can be obtained by applying the disclosed invention in a different manner for modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a pivotable trailer extension including a platform pivotably mounted to an upwardly extending support member for trailers. More specifically, the invention comprises a pivotable platform on which is mounted a conventional trailer winch and a conventional V-block. The platform is dynamically pivotable relative to the upward extending support member such that the bow of a boat winched into the V-block during the loading of the boat onto a trailer from a sloped boat dock remains fully chocked up as the boat and trailer are pulled from the water.

An industry standard winch is secured to the platform which in turn is pivotably connected to the upwardly projecting support member. A V-block is rigidly attached to the platform at a position just above said winch mechanism in order that the angle of separation between the two devices is constantly maintained at the smallest distance possible. The entire platform is dynamically pivotable upwardly and downwardly within the longitudinal plane of the trailer.

Dynamic pivotability coupled with a minimum number of working parts reduces the overall weight and physical size of the pivotable trailer extension device without sacrificing the requisite rigidity for maximum functional performance in severe operating conditions. Specifically, during rough sea conditions, the boat that is to be removed from the water is unstable. The pivoting action of the platform of the invention simplifies the loading of the boat onto the trailer during unstable conditions. Not only is simple loading achieved, but damage to the boat's hull and eyelet is averted.

The V-block is positioned with respect to the winch mechanism to allow for chocking up of a vessel's bow at a position much closer to the path of the cable. This reduced distance further enhances the operational utility of the present invention.

The support members required for the instant invention are few in number which also enables the easy adaptability to and installation on a myriad of trailers presently available on the market today.

During loading of the boat onto the trailer, the trailer is backed down a sloped boat ramp into the water. The cable of the winch is secured to the eyelet of the boat's bow and the winch is operated whereupon the boat is forced onto the bunks or rollers of the trailer until the bow of the boat is fully chocked up to the V-block. As the boat and trailer are pulled from the water, the boat pivots on the bunks (or rollers) causing the bow to pivot upwardly as the boat settles onto the trailer. During the upward movement of the bow, the platform of the trailer extension of the invention pivots upwardly to assure that the bow remains fully chocked up. Hence, separation between the bow and the V-block is eliminated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and object of the invention, reference should be had to the following detailed description taken in connection with the accompanying drawings in which:

FIG. 1 is a perspective view of the pivotable trailer extension of the invention;

FIG. 2 is a sequential side elevational view of the pivotable trailer extension of the invention when a cable is firstly attached to the boat's eyelet;.

FIG. 3 is a side elevational view illustrating the positioning of the platform of the invention after loading a boat onto a trailer and pulling the boat and trailer from the water onto a level surface; and FIG. 4 is a frontal elevational view of the pivotable trailer extension shown in its fully upright position.

Similar reference characters refer to similar parts throughout the several views of the drawings.

DETAILED DESCRIPTION OF THE PREFERRED EMBODIMENT

The preferred embodiment herein described is not intended to be exhaustive or to limit the invention to the precise form disclosed. It is selected and described to best explain the principles of the invention so that others skilled in the art may utilize the invention.

FIG. 1 is a perspective view of the pivotable trailer extension 10 which may be constructed so as to be used on a standard boat trailer. The trailer 12 includes a generally horizontal frame 14 carried upon wheels, not shown. Trailer 12 normally includes bunks 13, and/or guide rollers (not shown in FIG. 1 but illustrated in FIGS. 3–4) which support a boat 16 upon the trailer 12. Trailer 12 is normally secured to a towing vehicle via suitable hitch device 18. A wheeled 13 retractable support post 20 generally extends downward from the trailer frame 14 behind hitch 18, to provide a means for storing boat 16 on the trailer 12 when it is not attached to a vehicle via hitch 18. The specific construction of trailer 12 can vary without departing from the spirit and scope of the intended invention.

Pivotable trailer extension 10 comprises a pivotable frame assembly 52 including upper parallel frame members 22 and 24 which are pivotably connected to lower parallel frame members 26 and 28 via bolts 29 and 30, respectively. The pivotable trailer extension 10 further comprises a winch platform 34 to which is mounted a winch assembly 40 and V-block 42. The vertically parallel frame members 22 and 24 are beveled inward at the upper end 51 of the pivotable frame assembly 52 to enhance rotatability and connectivity to the winch platform 34.

The frame assembly 52 as shown in FIGS. 1 and 2 is pivotably connected at its lower end 53 to an angularly sloping post 54 via the lower frame members 26 and 28 and bolts 31 and 32, respectively. The upper end 51 of the pivotable frame assembly 52 is also pivotably connected to the winch platform 34 via bolts 35 and 36. The winch platform 34 is similarly pivotably attached to the angularly sloping post 54 via two bolts 37 and 38. The winch assembly 40 is attached to platform 34 via bolts (not shown).

Referring to FIG. 2, said winch assembly 40 comprises a cranking arm 64 which engages a rotatable drum 66 via a set of gears 68. A cable 70 is wound around the rotatable drum 66 and during operation, the free end 71 of cable 70 is connected to a lifting eye of a boat. More specifically, the rotation of the cranking arm 64 engages a set of gears 68 which in turn engage the geared edge 72 of the rotatable drum 66 causing the cable 70 to be further wound on the rotatable drum 66.

The resilient bumper or V-block 42 is secured between frame members 44, 46, 48 and 50 above winch platform 34 via bolt 76 and nut 78. The resilient bumper frame assembly 74 is secured to the winch platform 34 via bolts 80, 81, 82 and 83. The resilient bumper 42 lends lateral support to a boat when it is fully chocked up on trailer 12.

Angularly sloping post 54 referred to above, extends generally upwardly from frame 14 behind the retractable support post 20. The angularly sloping post 54 is attached at its base via bolts (not shown) or by welding to trailer frame 14. Additional structural support is given to the angularly sloping post 54 by attachment to vertically standing member 58. Vertically standing frame member 58 is attached to trailer frame 14 via bolts (not shown) or by welding. The attachment between the angularly sloping post 54 and the vertically standing frame member 58 is accomplished via two rectangularly shaped bracket members 60 and 62 which are bolted at each of their ends to the angularly sloping post 54 and to the vertically standing frame member 58, respectively.

The mode of operation of the pivotable trailer extension 10 is shown sequentially in FIGS. 2-3. The beginning of loading operations using the present invention begins when the trailer 12 is immersed in water 84 on a sloping boat ramp 86. The cable 70 is drawn from the winch assembly 40 and is attached via hook 92 to the boat's 16 bow eyelet or bow lifting eye 88. At this initial stage of loading, the boat 16 is still freely floating on the water 84. Once the cable 70 is attached to the bow eyelet 88, winch crank 64 is rotated and cable 70 winds onto drum 66. In the process, boat 16 is drawn closer to the pivotable trailer extension 10 and accordingly, the length of cable between the bow eyelet 88 and the winch assembly 40, is decreased until the boat's bow 90 is fully chocked up to the V-block 42. Simultaneously therewith, boat 16 engages bunks 13 at a point roughly indicated by numeral 96 and may be forced to ride up onto the bunks 13 a short distance until the bow 90 of the boat 16 engages the V-block.

As the boat 16 and the trailer 12 are pulled from the water onto a flat surface, the boat 16 pivots about point 96 until the boat 16 comes to rest on the trailer 12. Such pivoting action causes the bow 90 to move upwardly as the boat 16 settles onto the trailer 12. However, as the bow 90 moves upwardly, the platform 34 of the pivotable trailer extension 10 pivots upwardly. This upward pivoting action in turn raises the winch assembly 40 which is supported by winch platform 34 into a generally greater angle with respect to the horizontal plane of the surface.

Hence, once boat 16 and the trailer 12 are fully pulled out of the water, the boat's bow 90 will remain snugly secured against the resilient bumper or V-block 42. At this stage, the pivoting of the invention will have stopped and the boat 16 will be securely on the trailer 12 and no additional cranking will be required to draw the boat to the V-block.

From the foregoing description, it is noted that the pivotable trailer extension 10 of the invention is particularly suited to use with large boats since the pivoting action of the pivotable frame assembly 52 in conjunction with the pivoting winch platform 34 simplifies the cranking operation of the boat into engagement with the V-block 42. It is also noted that the pivotable trailer extension 10 of the invention is particularly suited to operate on a variety of different sloping boat ramps.

The usefulness of the pivotable trailer extension device of the invention 10 is particularly marked during rough water conditions. During such times, the water level upon which the boat 10 is floating at times violently changes. The pivotable trailer extension 10 compensates for the same making not only operation simpler but also reduces strain and the possibility of damage to the cable 70, the boat hull 10 or its eyelet 88.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A pivotable trailer extension for connection to a trailer hauling a boat or other watercraft, comprising in combination:

a platform;

a winch assembly;

a chock assembly;

means for fixedly connecting said winch assembly and said chock assembly to said platform, said means comprising means for pivotably connecting said platform to an upstanding support member affixed to the front portion of the trailer and positioning said chock assembly above said winch assembly such that a cable of said winch assembly passes underneath said chock assembly for connection to the bow of the boat and such that said chock assembly remains stationary relative to said winch assembly; and means for connecting said platform to a front portion of the trailer in alignment with a bow of the boat, whereby said platform, said winch assembly and said chock assembly may simultaneously pivot upwardly together as the boat is chocked up to said chock assembly by said winch assembly and the boat and trailer are removed from a body of water having a boat ramp onto a level surface.

2. The pivotable trailer extension as set forth in claim 1, wherein said means for positioning said chock assembly above said winch assembly comprises a pair of upstanding support members affixed to opposing sides of said platform and to opposing sides of a chock such that said chock of said chock assembly is elevationally positioned above said platform with said winch assembly positioned therebelow and having the cable of said winch assembly threaded between said opposing support members.

3. The pivotable trailer extension as set forth in claim 1, further comprising a pivotable frame assembly interconnecting said platform to said upstanding support to limit the upward travel of said platform during pivoting of said platform relative to said upstanding support.

4. The pivotable trailer extension as set forth in claim 3, wherein said pivotable frame assembly comprises a pair of upper frame members pivotably connected at one end to opposing sides of said platform and a pair of lower frame members pivotably connected at one end to opposing sides of said upstanding support, said frame members being connected together with each other at their other end, respectively, to thereby limit the upward travel of said platform relative to said upstanding support.

5. A pivotable trailer extension for connection to an upstanding support positioned in a front portion of a boat trailer for hauling a boat or other watercraft, comprising in combination:

a platform;

means for pivotably connecting said platform to said upstanding support in alignment with a bow of the boat allowing said platform to pivot upwardly relative to said upstanding support;

a pivotable frame assembly for limiting the upward travel of said platform relative to said upstanding support, said pivotable frame assembly comprising an upper frame member having one end pivotably connected to said platform and another end pivotably connected to one end of a lower frame member, said lower frame member having another end pivotably connected to said upstanding support member;

a winch assembly including a cable for connection to the bow of the boat and a drum for winding said cable thereabout by means of a crank;

means for affixing said winch assembly to said platform;

a chock assembly including a chock for engagement with the bow of the boat and means for positioning said chock relative to said platform in a position above said winch assembly allowing said cable of said winch assembly to pass underneath said chock for connection to the bow of the boat, whereby, with the boat trailer being positioned on a boat ramp at an acute angle relative to the surface of a body of water, said cable may be connected to the bow of the boat and said winch assembly operated via said crank to pull the boat into a full chocked position into said chock of said chock assembly such that the boat is properly positioned above the boat trailer and, further, as the boat and trailer are pulled from the boat ramp onto a level surface, said platform pivots upwardly allowing the boat to become seated upon the trailer while simultaneously maintaining a constant angle between said cable and said chock to thereby assure that the boat remains in the fully chocked up position.

* * * * *